(12) United States Patent
Vu

(10) Patent No.: US 10,994,787 B2
(45) Date of Patent: May 4, 2021

(54) VEHICLE SPLASH GUARD

(71) Applicant: NISSAN NORTH AMERICA, INC., Franklin, TN (US)

(72) Inventor: Long Vu, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/584,375

(22) Filed: Sep. 26, 2019

(65) Prior Publication Data

US 2021/0094620 A1   Apr. 1, 2021

(51) Int. Cl.
*B62D 25/18* (2006.01)
*B62D 25/16* (2006.01)

(52) U.S. Cl.
CPC ........... *B62D 25/168* (2013.01); *B62D 25/18* (2013.01)

(58) Field of Classification Search
CPC .... B62D 25/168; B62D 25/16; B62D 25/163; B62D 25/18; B62D 25/188
USPC ................................ 280/851, 847, 848, 154
See application file for complete search history.

(56) References Cited

U.S. PATENT DOCUMENTS

| 5,048,868 A * | 9/1991 | Arenhold | B62D 25/18 280/848 |
| 10,668,955 B2 * | 6/2020 | Siegel | B62D 25/18 |
| 2013/0161935 A1 * | 6/2013 | Ward | B62D 25/182 280/851 |

FOREIGN PATENT DOCUMENTS

| DE | 8329615 U1 | 3/1985 |
| GB | 2074109 A * | 10/1981 |

* cited by examiner

*Primary Examiner* — John D Walters
(74) *Attorney, Agent, or Firm* — Global IP Counselors, LLP

(57) ABSTRACT

A vehicle splash guard includes a flexible body and a body panel attachment area. The body panel attachment area is integrated with the flexible body, the body panel attachment area is configured to abut a vehicle body panel component, the body panel attachment area including a pair of positioning tabs extending towards the vehicle body panel component and receiving the vehicle body panel component therebetween in a state in which the splash guard is installed to the vehicle body panel component.

19 Claims, 9 Drawing Sheets

VEHICLE SPLASH GUARD

BACKGROUND

Field of the Invention

The present invention generally relates to vehicle splash guard. More specifically, the present invention relates to vehicle splash guard for a vehicle body panel component.

Background Information

Vehicle tires can propel a large amount of debris during travel, such as mud, dirt and other wastes. The expelling of debris can cause damage to the vehicle exterior and also can be propelled towards external objects, such as pedestrians and other vehicles. Therefore, vehicles are typically equipped with splash guards that are fixedly attached to the vehicle body panel at a location adjacent to the wheel well. Splash guards are typically made of a flexible material, such as rubber. Splash guards can be large or rectangular or L-shaped sheets suspended behind the tires, or may be small molded lips below the rear of the vehicle's wheel wells. Splash guards are also referred to as mud flaps. Splash guards can be aerodynamically engineered, utilizing shaping, louvers or vents to improve airflow and lower drag.

SUMMARY

In view of the state of the known technology, one aspect of the present disclosure is to provide a vehicle splash guard comprising a flexible body and a body panel attachment area. The body panel attachment area is integrated with the flexible body, the body panel attachment area is configured to abut a vehicle body panel component, the body panel attachment area including a pair of positioning tabs extending towards the vehicle body panel component and receiving the vehicle body panel component therebetween in a state in which the splash guard is installed to the vehicle body panel component.

In view of the state of the known technology, another aspect of the present disclosure is to provide a vehicle comprising a vehicle body panel component and a splash guard. The splash guard is fixedly attached to the vehicle body panel component. The splash guard has a body panel attachment area that is fixed to the vehicle body panel component. The body panel attachment area includes a pair of positioning tabs that receives a portion of the vehicle body panel component therebetween.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
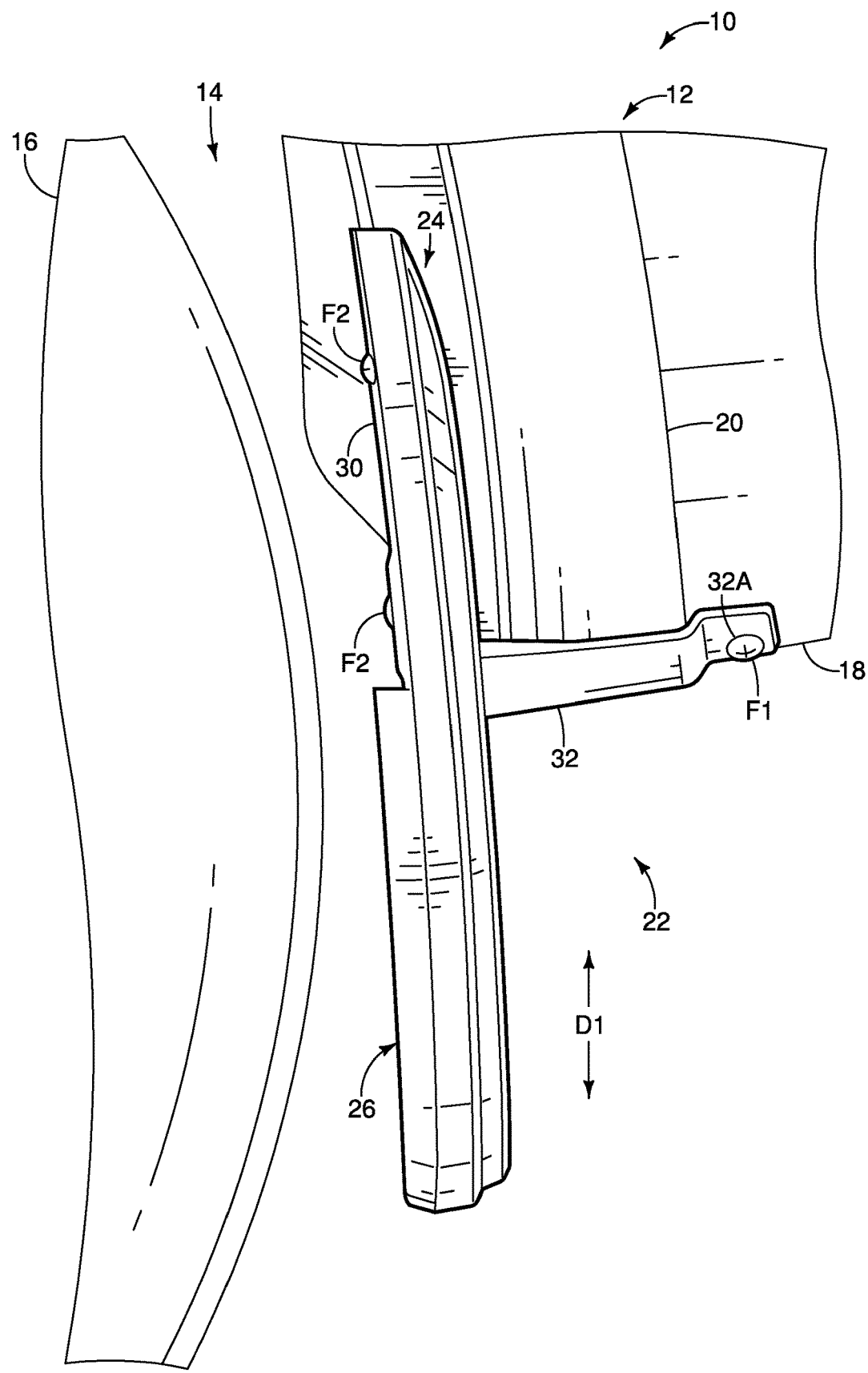
FIG. 1 is a portion of a vehicle wheel well showing a vehicle body panel component having a splash guard attached thereon.

Referring initially to FIG. 1, a portion of a vehicle 10 is illustrated having a vehicle body panel component 12 that is adjacent to a vehicle wheel well 14. The vehicle 10 includes a tire 16 that is disposed in the wheel well 14. In the illustrated embodiment, the vehicle body panel component 12 includes at least one of a vehicle fender 18 and a vehicle overfender 20. In FIG. 1 in particular, the overfender 20 is provided over the fender 18. The overfender 20 is considered a trim piece that is installed to the fender 18. The overfender 20 can alternatively be called a wheel liner.

Together, the overfender 20 and the fender 18 are considered components that can be installed to the vehicle's 10 body along the perimeter of the wheel well 14 above the vehicle's 10 tire(s) 16. Therefore, the vehicle 10 includes a body panel, which can include the fender 18 or a quarter panel (not shown) with the overfender 20 installed thereon. Thus, in the illustrated embodiment, the vehicle body panel component 12 includes both the fender 18 and the overfender 20. However, it will be apparent to those skilled in the vehicle field from this disclosure that the vehicle body panel component 12 can just be considered the fender 18 as the fender 18 can alternatively be provided to the vehicle 10 without an overfender 20, as will be further described below.

Figure 3:
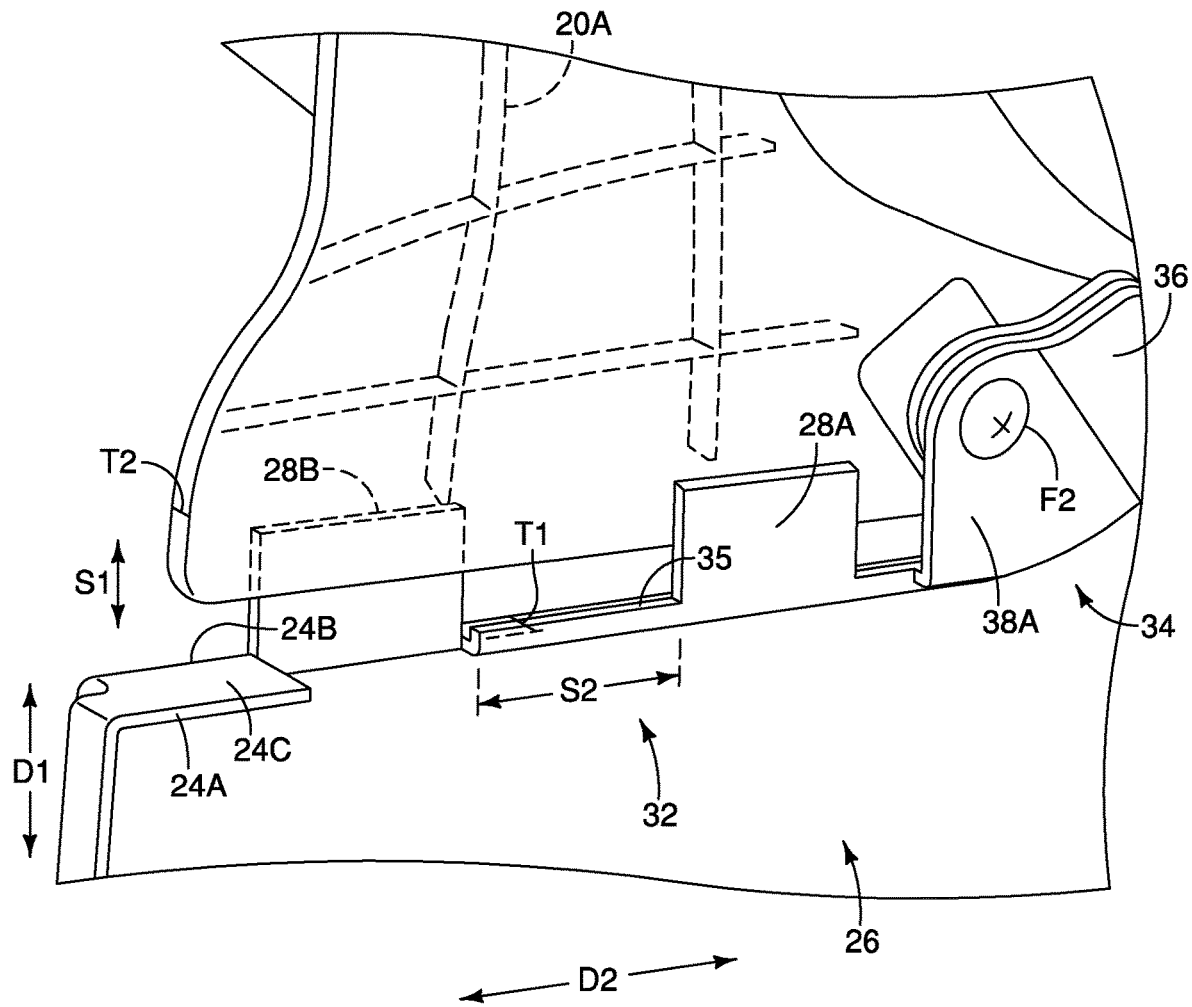
FIG. 3 is an enlarged view of a portion of FIG. 2 showing the attachment of the splash guard to the vehicle body panel component.

In the illustrated embodiment, the overfender 20 is conventional and can be made of sheet metal, fiberglass, carbon fiber, or fiber-reinforced plastic. As best seen in FIG. 3, the overfender 20 can include stiffening ribs 20A extending along the body of the overfender 20. The stiffening ribs 20A can make the overfender 20 a substantially rigid piece that is not easily deformable, and helps maintain the shape and structure of the overfender 20 throughout the use of the vehicle. Typically, overfenders are provided for vehicles having wider wheels. The overfender 20 serves as a deflector for protecting the wheel well 14 and the vehicle body panel from debris during the vehicle's 10 use.

When the vehicle 10 is running, debris such as sand, mud, rocks, liquids, etc. may be sprayed by the rotating tire 16. For example, during forward driving, the top of the tire 16 rotates upward and forward, and can propel objects into the air at other vehicles, pedestrians and/or external objects. Therefore, the vehicle 10 is equipped with a splash guard 22 to deflect debris from accumulating along the wheels and the wheel well 14. Thus, the vehicle 10 further includes the splash guard 22 that is provided to the fender 18 and the overfender 20, as will be further discussed below.

As shown in FIG. 1, the splash guard 22 of the illustrated embodiment is fixedly attached to the overfender 20 and to the fender 18 of the vehicle 10. Although FIG. 1 illustrates the splash guard 22 as being a rear splash guard that is attached behind a rear tire (e.g., the tire 16), it will be apparent to those skilled in the vehicle field from this disclosure that the described components of the splash guard 22 can be alternatively implemented as a front splash guard that is installed behind a front tire. Therefore, the splash guard 22 can alternatively be attached to the front fender 18 and an overfender 20 for the front fender 18. Thus, it will be apparent to those skilled in the vehicle field from this disclosure that the vehicle body panel component 12 can include a front fender 18 and a front overfender 20 that is provided to the vehicle 10.

The splash guard 22 (alternatively called a mud flap) is used in combination with the overfender 20 to protect the vehicle 10, passengers, other vehicles, and pedestrians from mud and other flying debris thrown into the air by rotating tire 16 of the vehicle 10. Splash guards are typically made from flexible material(s) such as rubber that is not easily damaged by contact with flying debris, the tire 16, or the road surface. The splash guard 22 is typically made from sturdy and flexible material such as vulcanized rubber, including polypropylene (PP)/ethylene-propylene-diene (EPDM) or thermoplastic olefin (TPO).

As shown in FIGS. 1 to 5, the splash guard 22 is installed directly to the overfender 20. The splash guard 22 further includes a portion that is directly fixed to the fender 18. In particular, the splash guard 22 has a body panel attachment area 24 that is configured to abut the overfender 20. The body panel attachment area 24 also abuts the fender 18 in the illustrated embodiment. Therefore, the body panel attachment area 24 abuts the vehicle body panel components 12 of the vehicle 10. Alternatively speaking, the splash guard 22 is fixedly attached to the vehicle body panel component 12, such as the overfender 20 and the fender 18. The body panel attachment area 24 is fixedly attached to the overfender 20 by a plurality of fasteners F1 and F2, as will be explained below.

The splash guard 22 further includes a flexible body 26 that is integrally formed with the body panel attachment area 24. That is, the body panel attachment area 24 and the flexible body 26 are preferably integrally molded as a one-piece member. The flexible body 26 is substantially rectangular-shaped and is suspended behind the tire 16 when the splash guard 22 is installed to the vehicle body panel component 12. The flexible body 26 deflects debris from the vehicle 10 during use of the vehicle 10.

Figure 2:
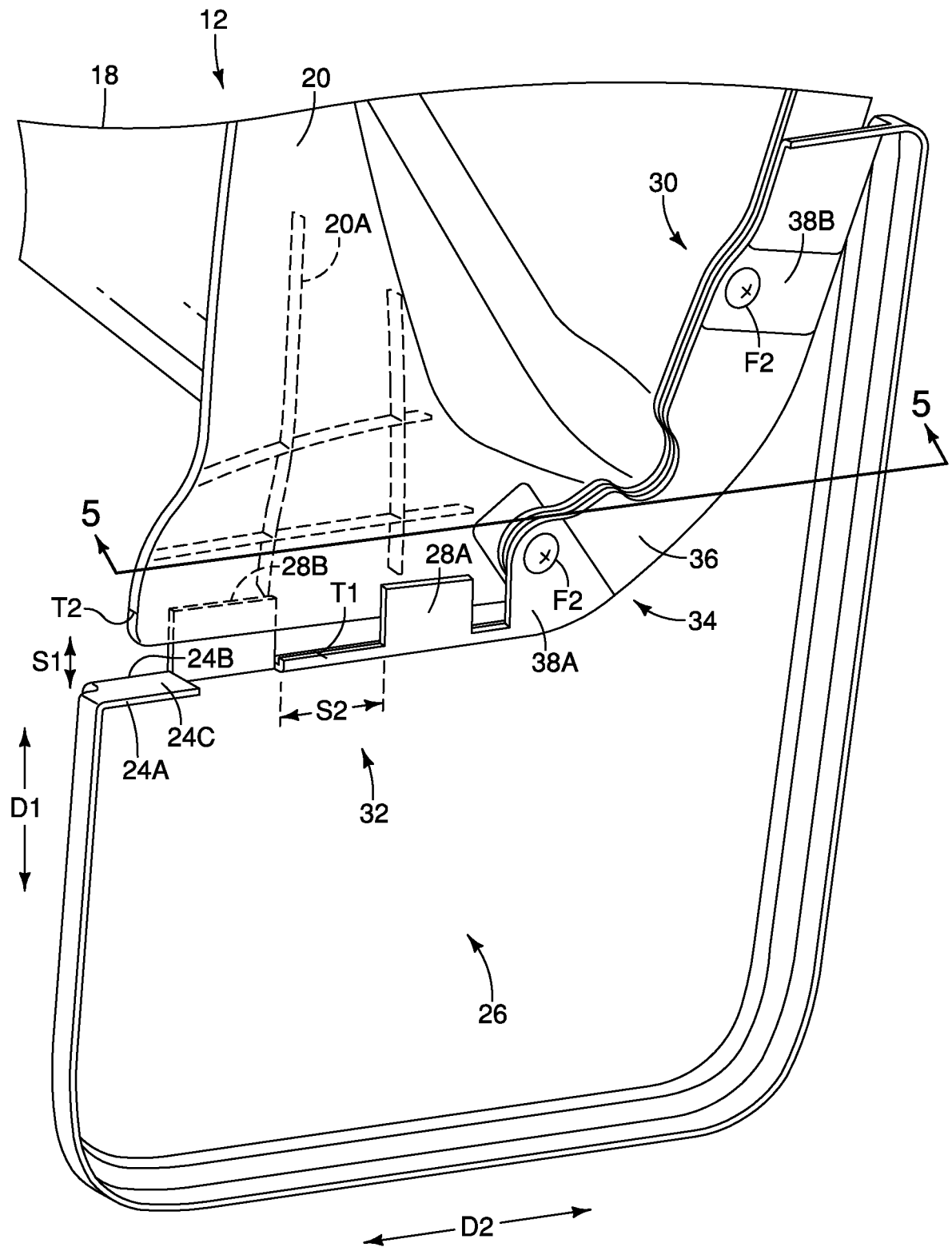
FIG. 2 is a perspective view of the splash guard and the vehicle body panel component from a wheel well facing side of the splash guard.
Figure 4:
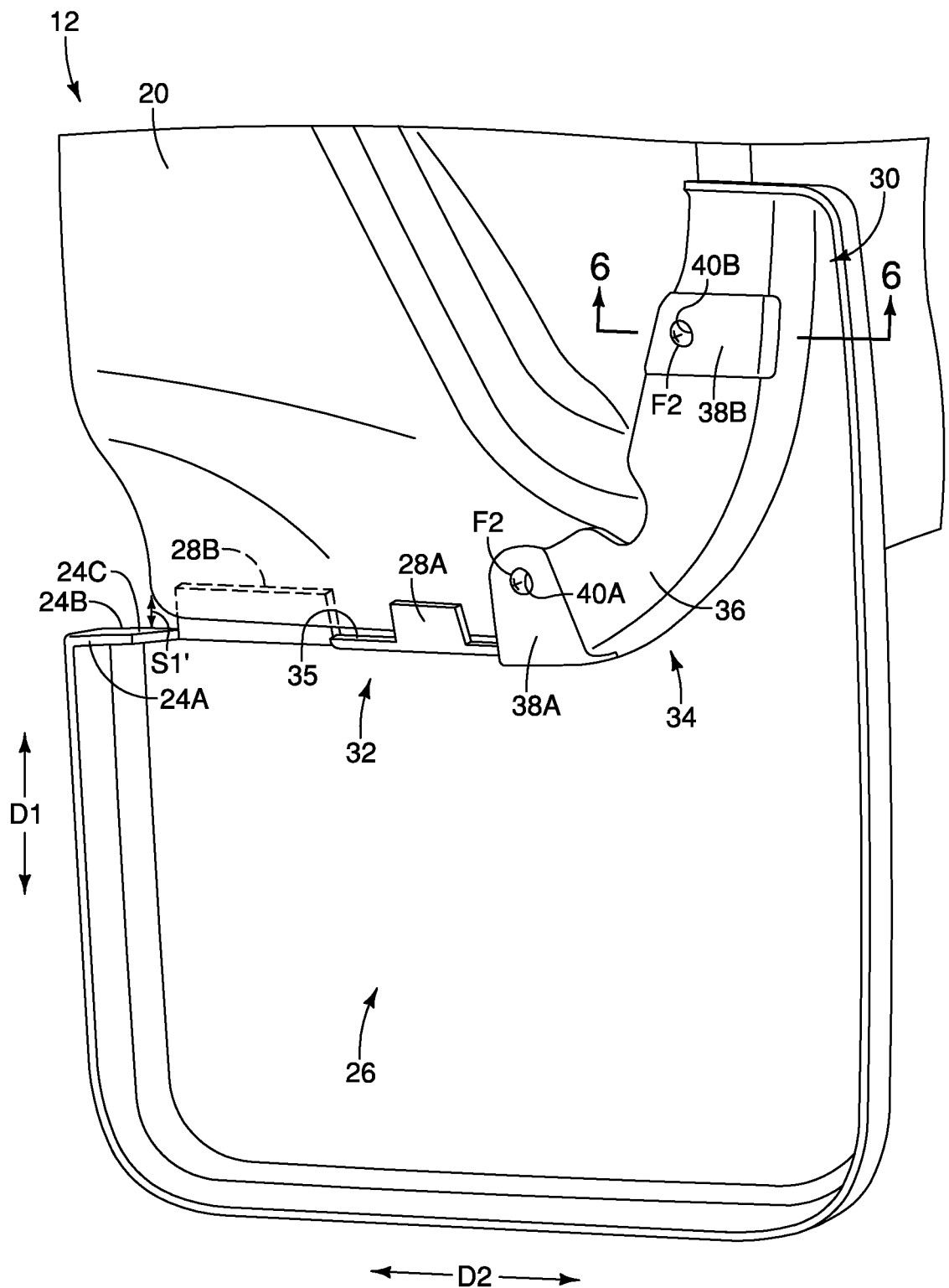
FIG. 4 is another perspective view of the splash guard and the vehicle body panel component from a wheel well facing side of the splash guard.

Referring to FIGS. 2 and 4, the splash guard 22 can be sized and dimensioned to allow for a degree of manufacture variation spacing S1 due to manufacture variation of the vehicle body, or the vehicle body panel components 12. In other words, the splash guard 22 is made and configured to accommodate vehicle body panel components 12 of different dimensions and sizes. In the illustrated embodiment, the manufacture variation spacing S1 is a distance between the body panel attachment area 24 and the overfender 20 when the splash guard 22 is installed to the overfender 20. For example, the splash guard 22 can be spaced from the overfender 20 by the manufacturing variation spacing S1 that is shown in FIG. 2. Alternatively, the splash guard 22 can be spaced from the overfender 20 by a different manufacturing variation spacing S1', which is shown in FIG. 4, in the occasion that the overfender 20 is larger.

In the illustrated embodiment, the splash guard 22 includes a pair of positioning tabs 28A and 28B extending from the body panel attachment area 24 towards the vehicle body panel component 12. In particular, the positioning tabs 28A and 28B extend toward the overfender 20 to receive a portion of the overfender 20 therethrough. The positioning tabs 28A and 28B help secure the attachment of the splash guard 22 to the vehicle body panel component 12 while helping to maintain a desired flexibility of the splash guard 22 during use of the vehicle. When the splash guard 22 is installed to the overfender 20, the splash guard 22 will deform or bend in the vehicle forward or rearward directions when the vehicle 10 is in use. As the splash guard 22 is made of a flexible or deformable material, the splash guard 22 will have possess a degree of flexibility in order to deflect debris from the vehicle 10 during use. However, to reduce unwanted flutter of the splash guard 22 in the vehicle forward and rearward directions, the splash guard 22 is provided with the positioning tabs 28A and 28B. Too much undesired flutter, such as wind flutter, can decrease the ability of the splash guard 22 to deflect debris. However, the splash guard 22 should maintain a degree of flexibility and determability at the same time in order to deflect debris.

Referring to FIGS. 2 to 4, the positioning tabs 28A and 28B extend from the body panel attachment area 24 towards the overfender 20 to abut the overfender 20. In particular, the positioning tabs 28A and 28B receive a portion of the overfender 20 by interference fit. That is, the positioning tabs 28A and 28B are attached to the overfender 20 by press fit or friction fit. In this way, the positioning tabs 28A and 28B help secure the splash guard 22 to the vehicle body panel component 12 and is attached to the vehicle body panel component 12 to reduce flutter of the splash guard 22 when installed.

The positioning tabs 28A and 28I1 are integrally formed with the body panel attachment area 24. The first and second positioning tabs 28A and 28B are also integrally molded to be one-piece with the flexible body 26. That is, the positioning tabs 28A and 28B are preferably also made of a flexible but sturdy material such as TPO. Therefore, the positioning tabs 28A and 28B enable a secure fit of the splash guard 22 along the overfender 20 while allowing the splash guard 22 to maintain a desired degree of flexibility during use. While the splash guard 22 of the illustrated embodiment is shown as including a pair of positioning tabs 28A and 28B, it will be apparent to those skilled in the vehicle field that the splash guard 22 can include additional positioning tabs 28A and 28B along the body panel attachment area 24 as needed and/or desired. The positioning tabs 28A and 28B will be further discussed and described below.

As seen in 2, 4 and 5, the body panel attachment area 24 is sized and dimensioned to conform to the shape of the overfender 20. The body panel attachment area 24 includes a wheel well facing side 24A, a fender facing side 24B, and an attaching surface 24C connecting the wheel well facing side 24A and the fender facing side 24B. The wheel facing side faces the wheel well 14 in the state in which the splash guard 22 is installed to the vehicle body panel component 12. The fender facing side 24I faces the fender 18 in the state in which the splash guard 22 is installed to the vehicle body panel component 12. The attaching surface 24C preferably has a thickness T1 that corresponds to a thickness T2 of the vehicle body panel component 12. In other words, the thickness T1 of the attaching surface 24C preferably is the same as the thickness T2 of the overfender 20. As the positioning tabs 28A and 28B extend from either side of the attaching surface 24C, the positioning tabs 28A and 28B can receive the overfender 20 by interference fit.

As best seen in FIGS. 2 and 4, the body panel attachment area 24 of the illustrated embodiment is shown as being L-shaped having an elongated section 30 and a lateral section 32 extending at an angle with respect to each other. Therefore, the body panel attachment area 24 includes the elongated section 30 that extends in a vehicle height direction D1 in the state in which the splash guard 22 is installed to the vehicle body panel component 12. The body panel attachment area 24 further includes the lateral section 32 that extends at an angle with respect to the elongated section 30. Thus, the lateral section 32 extends in a vehicle width direction D2. The body panel attachment area 24 further includes a curved section 34 connecting the elongated section 30 and the lateral section 32. While the splash guard 22 of the illustrated embodiment is shown as being L-shaped at the body panel attachment area 24, it will be apparent to those skilled in the vehicle field from this disclosure that the positioning tabs 28A and 28B can be implemented with a splash guard 22 having different shapes.

Figure 7:
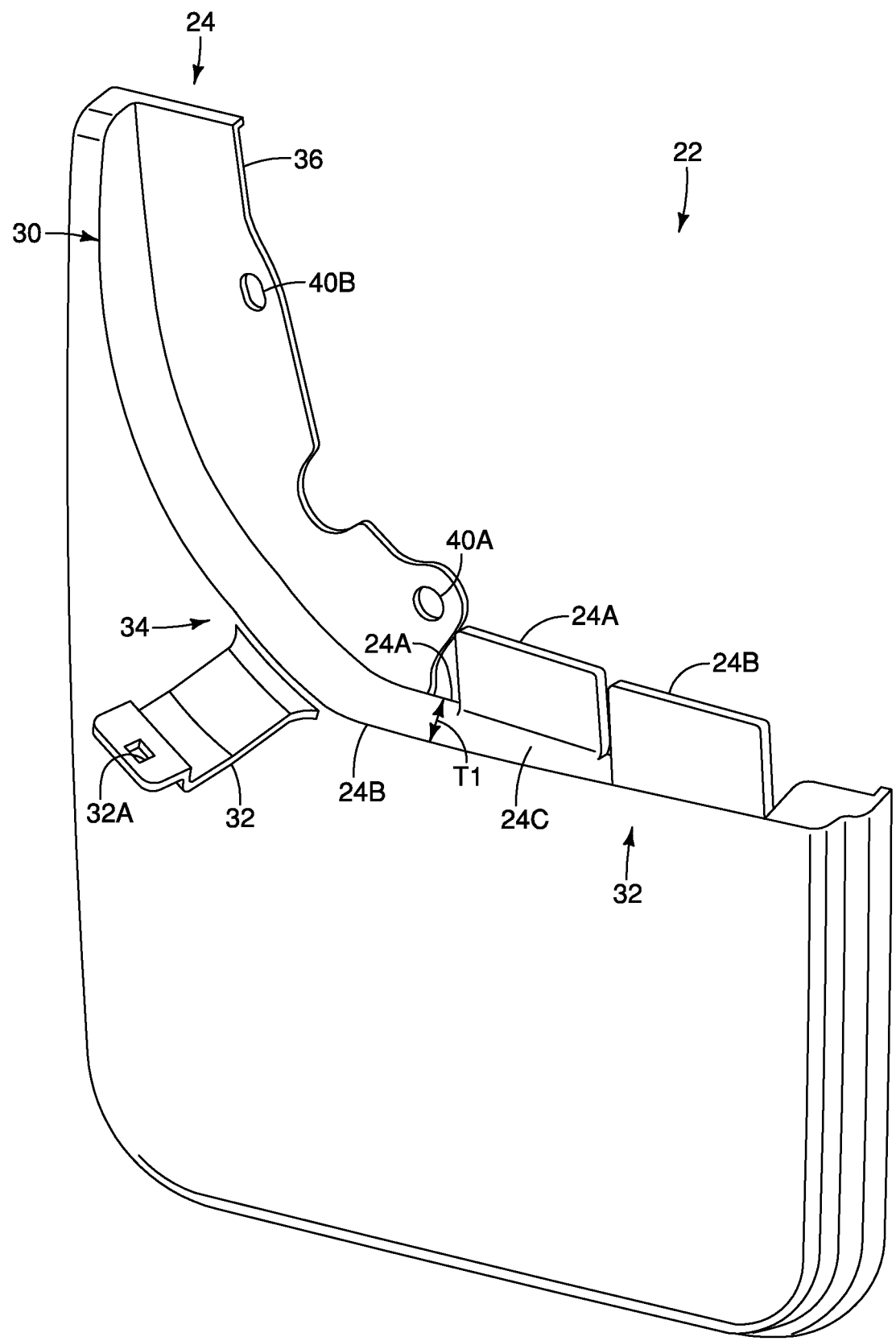
FIG. 7 is an elevational view of the splash guard.

As stated, the splash guard 22 is also directly fixed to the fender 18. In particular, the body panel attachment area 24 further includes a vehicle body attachment 32 extending from the fender facing side 24B towards the fender 18, as best seen in FIGS. 1 and 7. In particular, the vehicle body attachment 32 is an elongated protrusion extending past the overfender 20 and is fixedly attached to the fender 18. The vehicle body attachment 32 is sized and shaped to conform to the contours of the overfender 20 as the protrusion extends past the overfender 20. Therefore, the vehicle body attachment 32 is sized and dimensioned to abut the overfender 20. As best seen in FIG. 7, the vehicle body attachment 32 includes a through hole 32A disposed at an end of the vehicle body attachment 32 for receiving a fastener F1 therethough. The fastener F1 secures the vehicle body attachment 32 to the fender 18. The fastener F1 is conventional and can be a through-bolt or a screw.

In the illustrated embodiment, the pair of positioning tabs 28A and 28B of the splash guard 22 includes first and second positioning tabs 28A and 28B. Referring to FIGS. 2 and 3, the first positioning tab 28A extends from the wheel well facing side 24A. The second positioning tab 28B extends from the fender facing side 24B. Therefore, the first and second positioning tabs 28A and 28B extend from opposite sides of the attaching surface 24C. As best seen in FIG. 3, wheel well facing side 24A includes a ribbed extension 35 extending in the vehicle widthwise direction between the first and second positioning tabs 28A and 28B. The ribbed extension 35 helps stiffen the body panel attachment area 24 and to help increase the stiffness of the positioning tabs 28A and 28B.

Figure 5:
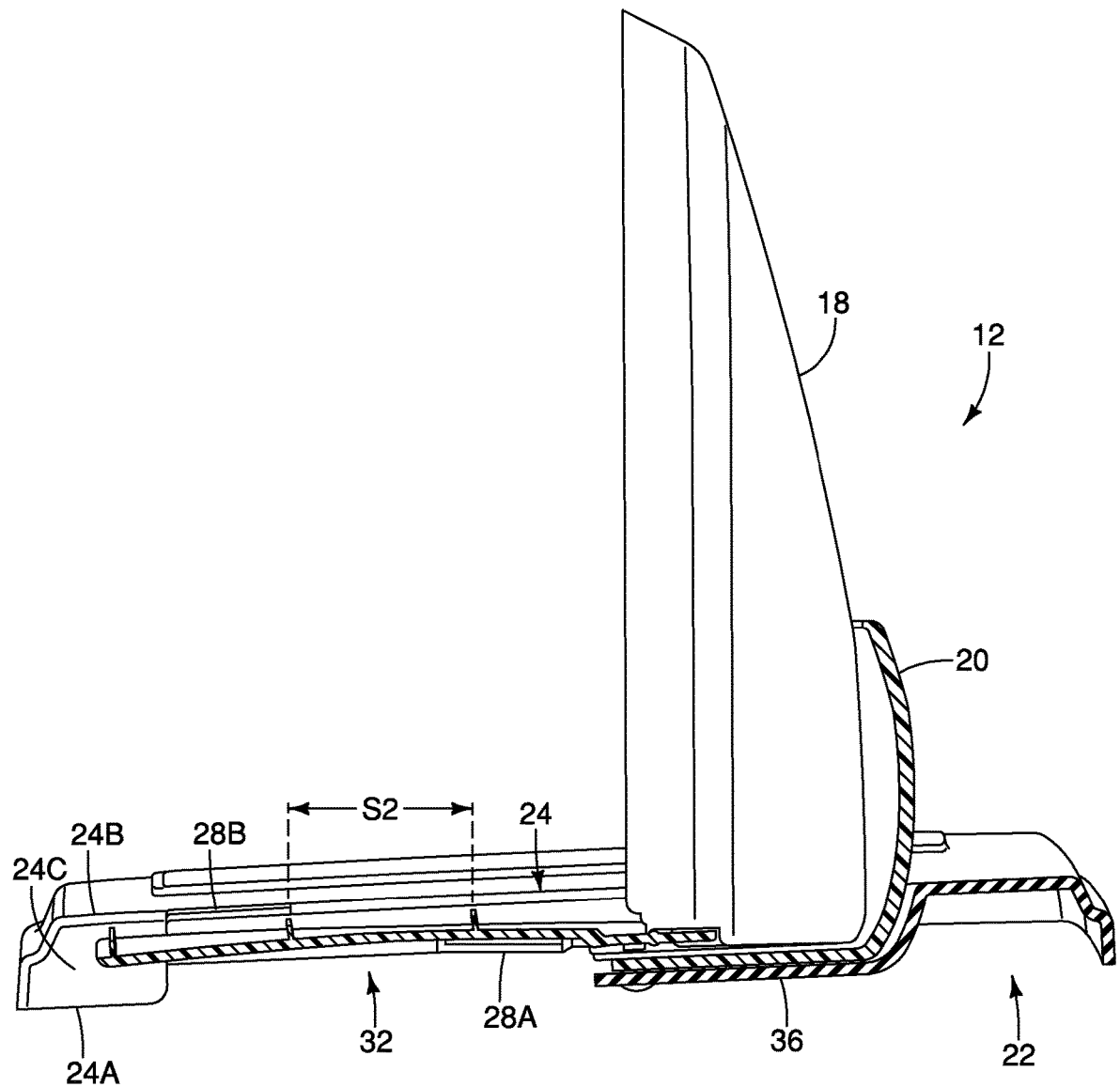
FIG. 5 is a cross-sectional view of the splash guard and the vehicle body panel component taken along lines 5-5 of FIG. 2.

As best seen in FIGS. 2, 3 and 5, the first and second positioning tabs 28A and 28B are disposed in the lateral section 32 of the body panel attachment area 24. The first and second positioning tabs 28A and 28B are spaced with respect to each other along the lateral section 32 by an installation spacing S2. The installation spacing S2 is a distance between the first and second positioning tabs 28A and 28B along the vehicle width direction D2. The positioning tabs 28A and 28B are spaced to reduce the required angle that the splash guard 22 needs to be bent in order to install the splash guard 22 to the overfender 20. In particular, with larger tire 16 sizes, the clearance space between the tire 16 and the overfender 20 decreases. Thus, the first and second positioning tabs 28A and 28B are spaced apart by the installation spacing S2 to reduce the area needed to install the splash guard 22 to the overfender 20. In the illustrated embodiment, the positioning tabs 28A and 28B are spaced with respect to each other by about 1.5 to 2.5 millimeters. More preferably, the positioning tabs 28A and 28B are spaced by the installation space that is approximately 2 millimeters.

Referring to FIGS. 4 and 5, the body panel attachment area 24 further includes an attaching sidewall 36 for attaching the splash guard 22 to the overfender 20. The attaching sidewall 36 extends from the elongated section 30 and the curved section 34. The attaching sidewall 36 also extends from the attaching surface 24C in a direction towards the wheel well 14 in the state in which the splash guard 22 is installed to the vehicle body panel component 12. Therefore, the attaching sidewall 36 extends from the wheel well facing side 24A of the body panel attachment area 24. The attaching sidewall 36 allows the splash guard 22 to wrap around a portion of the overfender 20 to enable a secure fit to the overfender 20.

As best seen in FIGS. 2 and 4, the attaching sidewall 36 includes at least one bending portion 38A and 38B that defines an area of reduced strength relative to the body panel attachment area 24. As shown in FIG. 4, the at least one bending portion includes an edge formed by the attaching sidewall 36 and the attaching surface 24C of the body panel attachment area 24. In the illustrated embodiment, the attaching sidewall 36 includes a first bending portion 38A and a second bending portion 38B. The first and second bending portions 38A and 38B are indented areas along wheel well facing side 24A of the attaching sidewall 36. The first bending portion 38A is disposed in the elongated section 30 of the body panel attachment area 24, and the second bending portion 38B is disposed in the lateral section 32 of the body panel attachment area 24. Each of the first and second bending portions 38A and 38B includes a respective through hole 40A and 40B for receiving a fastener F2 that fastens the splash guard 22 to the vehicle body panel component 12. The fasteners F2 are conventional and can be a through bolts or screws.

Figure 6:
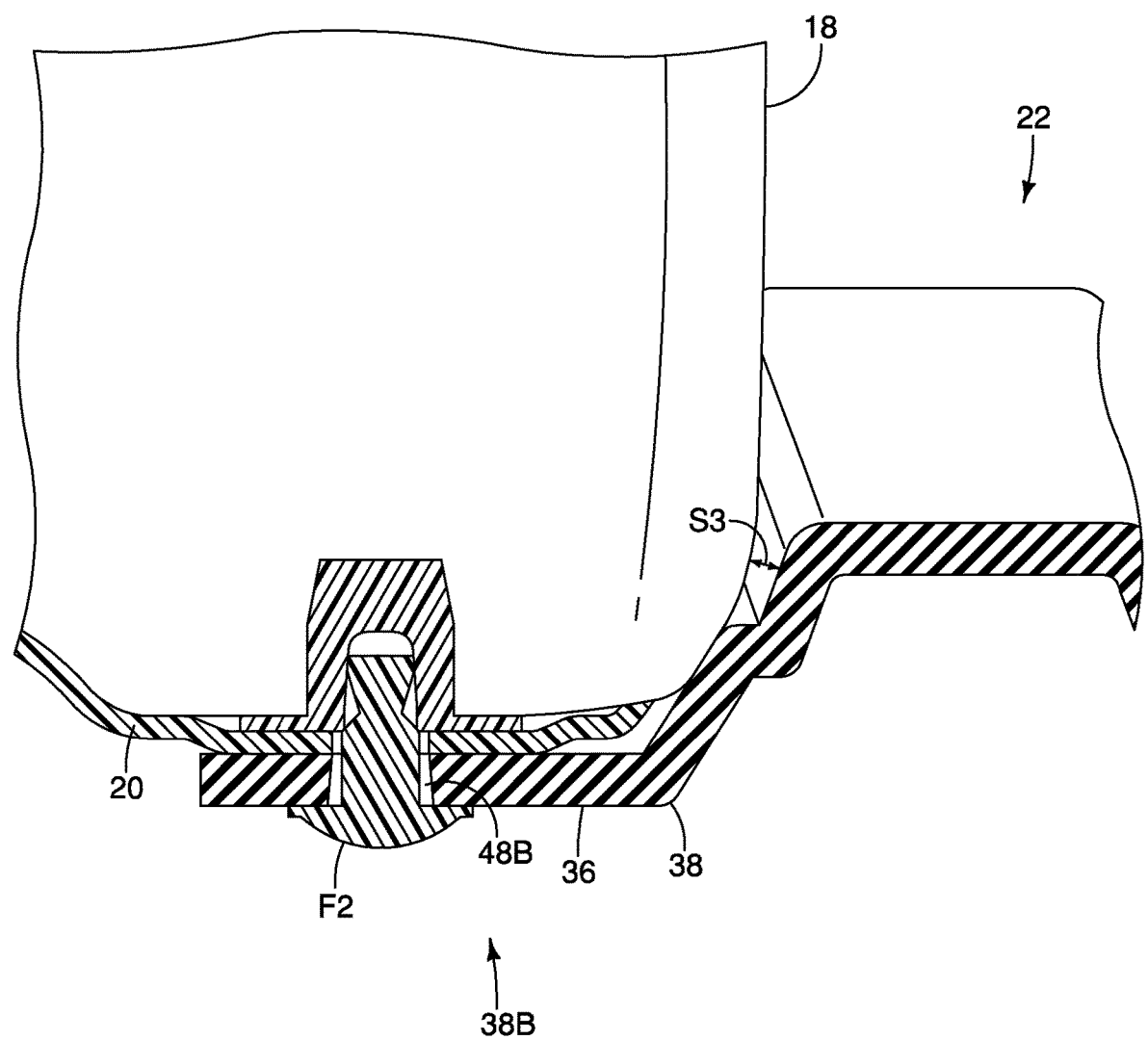
FIG. 6 is a cross-sectional view of the splash guard and the vehicle body panel component taken along lines 6-6 of FIG. 4.

The first and second bending portions 38A and 38B are standoffs that are provided to the splash guard 22 maintain a predetermined spacing S3 between the splash guard 22 and the overfender 20, as shown in FIG. 6. That is, if the splash guard 22 is non-spaced from the overfender 20 when installed to the overfender 20, the splash guard 22 can slowly deform as a result of constantly abutting the overfender 20 during use. As a result, the splash guard 22 can become sturdy due to deformation from constant contact with the overfender 20. Therefore, the first and second bending portions 38A and 38B are provided to maintain the splash guard 22 from the overfender 20 by the predetermined spacing S3 to prevent slow deformation of the splash guard 22. While the splash guard 22 of the illustrated embodiment includes two bending portions 38A and 38B, it will be apparent to those skilled in the vehicle field from this disclosure that the splash guard 22 can include additional or fewer bending portions at different locations along the splash guard 22, as needed and/or desired.

Figure 8:
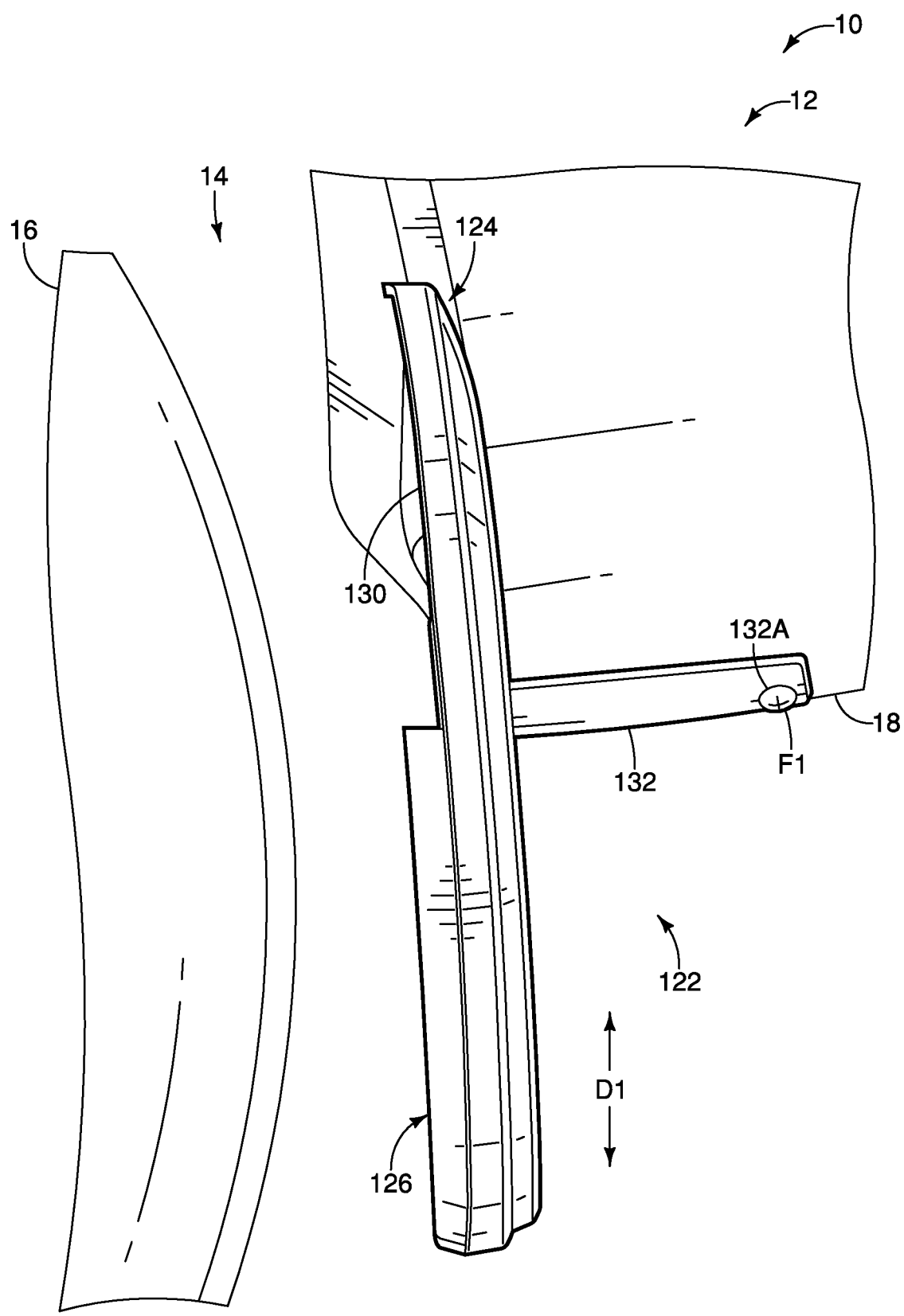
FIG. 8 is a portion of the vehicle wheel well showing another vehicle body panel component having a modified splash guard attached thereon.
Figure 9:
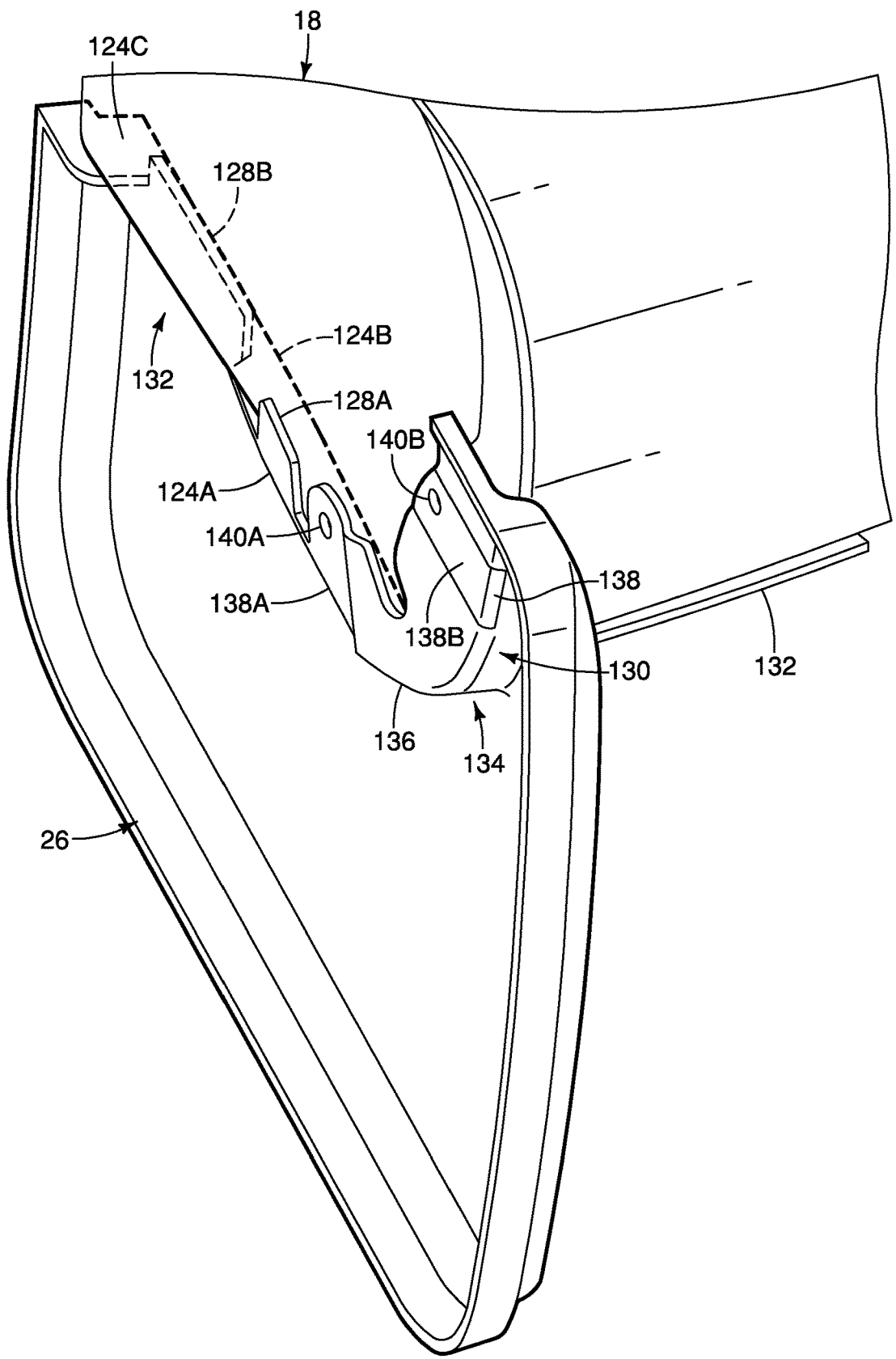
FIG. 9 is a top view of the modified splash guard attached to the another vehicle body panel component.

Referring to FIGS. 7 and 8, a modified splash guard 122 provided with the vehicle is illustrated. The modified splash guard 122 is basically identical to the splash guard 22 except that the modified splash guard 122 is provided directly to the fender 18. That is, the overfender 20 has been removed. For brevity, all components of the modified splash guard 122 will have the same reference numeral as the corresponding components on the splash guard 22 but increased by 100. The modified splash guard 122 also includes a body panel attachment area 124 that is fixed to the fender 18 and a flexible body 126 that is suspended with respect to the body panel attachment area 24. The modified splash guard 22 includes a vehicle body attachment 132 that is shaped and dimensioned to conform to the shape and dimension of the fender 18 to attach the modified splash guard 22 to the fender 18 by a fastener. The modified splash guard 122 also includes first and second positioning tabs 128A and 128B extending from the body panel attachment area 124 towards the fender 18, as seen in FIG. 8. The first and second positioning tabs 128A and 128B of the modified splash guard 122 receive a portion of the fender 18 therethrough. Thus, the first and second positioning tabs 128A and 128B of the modified splash guard 122 serve to reduce flutter of the modified splash guard 122 when directly attached to the fender 18. All of the components described for the splash guard 22 can be implemented with the modified splash guard 22 and will not be further described for brevity.

General Interpretation of Terms

In understanding the scope of the present invention, the term "comprising" and its derivatives, as used herein, are intended to be open ended terms that specify the presence of the stated features, elements, components or groups, but do not exclude the presence of other unstated features, elements, components or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle splash guard. Accordingly, these terms, as utilized to describe the present invention should be interpreted relative to a vehicle equipped with the vehicle splash guard.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle splash guard comprising:
a flexible body; and
a body panel attachment area integrated with the flexible body, the body panel attachment area is configured to abut a vehicle body panel component, the body panel attachment area including a pair of positioning tabs extending towards the vehicle body panel component and receiving the vehicle body panel component therebetween in a state in which the splash guard is installed to the vehicle body panel component, the flexible body extending from the body panel attachment area away from the vehicle body panel component so that the flexible body and the positioning tabs extend in opposite directions from the body panel attachment area with respect to each other.

2. The vehicle splash guard according to claim 1, wherein the body panel attachment area includes a wheel well facing side, a fender facing side, and an attaching surface connecting the wheel facing side and the fender facing side,
the wheel facing side facing a wheel well in the state in which the splash guard is installed to the vehicle body panel component, the fender facing side facing a vehicle fender in the state in which the splash guard is installed to the vehicle body panel component.

3. The vehicle splash guard according to claim 2, wherein a first positioning tab of the pair of positioning tabs extends from the wheel well facing side, the second positioning tab of the pair of positioning tabs extends from the fender facing side.

4. A vehicle splash guard comprising:
a flexible body; and
a body panel attachment area integrated with the flexible body, the body panel attachment area is configured to abut a vehicle body panel component, the body panel attachment area including a pair of positioning tabs extending towards the vehicle body panel component and receiving the vehicle body panel component therebetween in a state in which the splash guard is installed to the vehicle body panel component,
the body panel attachment area including a wheel well facing side, a fender facing side, and an attaching surface connecting the wheel facing side and the fender facing side,
the wheel facing side facing a wheel well in the state in which the splash guard is installed to the vehicle body panel component, the fender facing side facing a vehicle fender in the state in which the splash guard is installed to the vehicle body panel component,
a first positioning tab of the pair of positioning tabs extending from the wheel well facing side, the second positioning tab of the pair of positioning tabs extends from the fender facing side,
the body panel attachment area including an elongated section extending in a vehicle height direction in the state in which the splash guard is installed to the vehicle body panel component, and further including a lateral section extending at an angle with respect to the elongated area, the first and second positioning tabs being disposed in the lateral section.

5. The vehicle splash guard according to claim 4, wherein the first and second positioning tabs are integrally molded to be one-piece with the flexible body.

6. The vehicle splash guard according to claim 4, wherein the first and second positioning tabs are spaced with respect to each other along the lateral section.

7. The vehicle splash guard according to claim 6, wherein
the first and second positioning tabs are spaced with respect to each other by about 2 millimeters along the lateral section.

8. The vehicle splash guard according to claim 4, wherein
a flexible body; and
a body panel attachment area integrated with the flexible body, the body panel attachment area is configured to abut a vehicle body panel component, the body panel attachment area including a pair of positioning tabs extending towards the vehicle body panel component and receiving the vehicle body panel component therebetween in a state in which the splash guard is installed to the vehicle body panel component.

9. The vehicle splash guard according to claim 8, wherein
the body panel attachment area is fixedly attached to the vehicle body panel component at the attaching sidewall.

10. The vehicle splash guard according to claim 4, wherein
the attaching sidewall extends from the wheel well facing side of the body panel attachment area.

11. The vehicle splash guard according to claim 10, wherein
the attaching sidewall includes at least one bending portion that defines an area of reduced strength relative to the body panel attachment area.

12. The vehicle splash guard according to claim 11, wherein
the at least one bending portion includes an edge formed by the attaching sidewall and the attaching surface of the body panel attachment area.

13. The vehicle splash guard according to claim 12, wherein
the at least one bending portion includes a through hole for receiving a fastener that fastens the splash guard to the vehicle body panel component.

14. A vehicle comprising:
a vehicle body panel component; and
a splash guard fixedly attached to the vehicle body panel component, the splash guard having a flexible body and a body panel attachment area, the body panel attachment area being fixed to the vehicle body panel component, the body panel attachment area including a pair of positioning tabs that receives a portion of the vehicle body panel component therebetween, the flexible body extending from the body panel attachment area away from the vehicle body panel component so that the flexible body and the positioning tabs extend from the body panel attachment area in opposite directions with respect to each other.

15. The vehicle according to claim 14, wherein
the positioning tabs receive the vehicle body panel component by interference fit.

16. The vehicle according to claim 15, wherein
the vehicle body panel component includes at least one of a vehicle fender and a vehicle overfender.

17. The vehicle according to claim 16, wherein
the body panel attachment area includes a wheel well facing side, a fender facing side, and an attaching surface connecting the wheel facing side and the fender facing side,
the wheel facing side facing a wheel well of the vehicle, and the fender facing side facing the vehicle fender.

18. The vehicle splash guard according to claim 17, wherein
a first positioning tab of the pair of positioning tabs extends from the wheel well facing side, the second positioning tab of the pair of positioning tabs extends from the fender facing side.

19. The vehicle splash guard according to claim 14, wherein
the splash guard is a mudflap that hangs from the vehicle body panel component at the body panel attachment area so that the flexible body hangs in a wheel well of the vehicle.

* * * * *